US010473187B2

(12) United States Patent
Huang

(10) Patent No.: US 10,473,187 B2
(45) Date of Patent: Nov. 12, 2019

(54) CHAIN ASSEMBLY

(71) Applicant: MING CHANG TRAFFIC PARTS MANUFACTURING CO., LTD., Pingtung (TW)

(72) Inventor: Chien-Huao Huang, Pingtung (TW)

(73) Assignee: Ming Chang Traffic Parts Manufacturing Co., Ltd., Pingtung, Pingtung County (TW)

( * ) Notice: Subject to any disclaimer, the term of this patent is extended or adjusted under 35 U.S.C. 154(b) by 228 days.

(21) Appl. No.: 15/700,427

(22) Filed: Sep. 11, 2017

(65) Prior Publication Data

US 2019/0078648 A1 Mar. 14, 2019

(51) Int. Cl.
*F16G 13/07* (2006.01)

(52) U.S. Cl.
CPC .................... *F16G 13/07* (2013.01)

(58) Field of Classification Search
CPC .......... F16G 13/00; F16G 13/02; F16G 13/04; F16G 13/06; F16G 13/07
See application file for complete search history.

(56) References Cited

U.S. PATENT DOCUMENTS

| 4,978,327 A * | 12/1990 | Wu ...................... F16G 13/06 474/228 |
| 4,983,147 A * | 1/1991 | Wu ...................... F16G 13/06 474/206 |
| 5,151,066 A * | 9/1992 | Wu ...................... F16G 13/06 474/206 |
| 6,394,923 B1 * | 5/2002 | Huang ................ F16G 13/06 474/228 |
| 7,914,409 B2 * | 3/2011 | Aoki .................... F16G 13/06 474/212 |
| 2005/0266949 A1 * | 12/2005 | Kamada ............... F16G 13/06 474/231 |
| 2007/0155563 A1 | 7/2007 | Aoki |
| 2007/0180808 A1 * | 8/2007 | Wu ...................... F16G 13/06 59/84 |
| 2008/0287237 A1 * | 11/2008 | Aoki .................... F16G 13/06 474/228 |

(Continued)

FOREIGN PATENT DOCUMENTS

TW 412624 B 11/2000

*Primary Examiner* — Michael R Mansen
*Assistant Examiner* — Juan J Campos, Jr.
(74) *Attorney, Agent, or Firm* — Rosenberg, Klein & Lee

(57) ABSTRACT

A chain assembly includes interconnected chain units each having two rollers, two bushings disposed through the rollers, two inner plates rotationally disposed on the bushings, and two pins penetrating the bushings and the inner plates. Two outer plates are rotationally fixed to respective pins between adjacent inner plates. Each inner plate has two inner pin holes, two rims projecting from one surface of the inner plate, and a contact area formed around the rims. Each outer plate has two outer pin holes, two accommodation portions protruding from one surface of the outer plate to provide two rooms formed into opposing surface thereof, and a positioning area formed around the rooms for fitting snugly with adjacent contact areas when the respective rims are completely covered by the rooms. Therefore, the structure strength is increased, the transmission is stable and smooth, and no entry and accumulation of dust is incurred.

1 Claim, 3 Drawing Sheets

(56) References Cited

U.S. PATENT DOCUMENTS

| | | | |
|---|---|---|---|
| 2015/0094180 A1* | 4/2015 | Fukumori | B62M 9/00 |
| | | | 474/206 |
| 2015/0094182 A1* | 4/2015 | Fukumori | F16G 13/06 |
| | | | 474/206 |
| 2017/0067535 A1* | 3/2017 | Fukumori | F16G 13/06 |
| 2017/0138439 A1* | 5/2017 | Civiero | F16G 13/06 |
| 2019/0048973 A1* | 2/2019 | Fukumori | F16G 13/02 |
| 2019/0048974 A1* | 2/2019 | Fukumori | F16G 13/06 |

* cited by examiner

CHAIN ASSEMBLY

BACKGROUND OF THE INVENTION

1. Field of the Invention

This invention relates to a chain assembly and relates particularly to a chain assembly provided with preferable dust resistance, smooth and stable transmission, and enhanced structure strength to extend a service life.

2. Description of the Related Art

The applicant has disclosed a chain structure in a Taiwan Patent No. 412624, as shown in FIG. 1, the conventional chain structure 1 comprises a plurality of chain units 11 connected to each other. Each chain unit 11 has two aligned rollers 111, two bushings 112 disposed through the rollers 111 respectively, two inner plates 113 sleeved on the bushings 112, and two pins 114 threading through the bushings 112 and the inner plates 113 respectively. Two outer plates 12 are disposed on opposing sides of the inner plates 113 and pivotally fixed to the respective pins 114 between two adjacent inner plates 113 of the adjacent chain units 31. Each inner plate 113 has two inner pin holes 1131 and an annular rim 1132 projecting from the inner pin holes 1131 on one surface of each inner pin hole 1131. Each outer plate 12 has a peripheral flange 121 extending axially around one surface of the outer plate 12. The peripheral flange 121 assists in covering and positioning the annular rims 1132 when each outer plate 12 is disposed on the two abutting inner plates 113, thereby keeping dust outside.

However, the conventional chain structure 1 still has problems. Although the peripheral flange 1151 of each outer plate 115 covering the respective annular rims 1132 of the respective inner plates 113 can separate dust, the peripheral flange 1151 only encircles parts of the annular rims 1132 to result in a space formed among the surface of the outer plate 115 and the two annular rims 1132 of the abutting inner plates 113. Hence, dust still permeates and accumulates in the space to cause the unsteady transmission and the shortened service life and this requires an improvement.

SUMMARY OF THE INVENTION

The object of this invention is to provide a chain assembly with great dust resistance, stable and smooth transmission, and increased structure strength to extend a service life of the chain assembly.

The chain assembly of this invention includes a plurality of chain units linked together. Each chain unit has two aligned rollers, two bushings fitted through the rollers, two inner plates pivotally fitted on opposing sides of the bushings, and two pins passing through the bushings and inner plates respectively. Two outer plates are situated on opposing sides of the inner plates and pivotally fastened to the respective pins between two neighboring inner plates. Each inner plate has two inner pin holes. Two rims protrude from the inner pin holes on one surface of each inner plate. A contact area is formed around the rims. Each outer plate has two outer pin holes. Two accommodation portions project from the outer pin holes on one surface of each outer plate to provide two rooms formed into an opposing surface of each outer plate for accommodating the respective rims. A positioning area is formed around the rooms for fitting closely with the respective contact areas when each outer plate closely contacts with the two neighboring inner plates.

Thus, the structure strength is increased. The transmission is smooth and steady. Dust is kept from entering and piling in the chain assembly. Whereby the service life of the chain assembly is extended effectively.

DETAILED DESCRIPTION OF THE PREFERRED EMBODIMENTS

Figure 1:
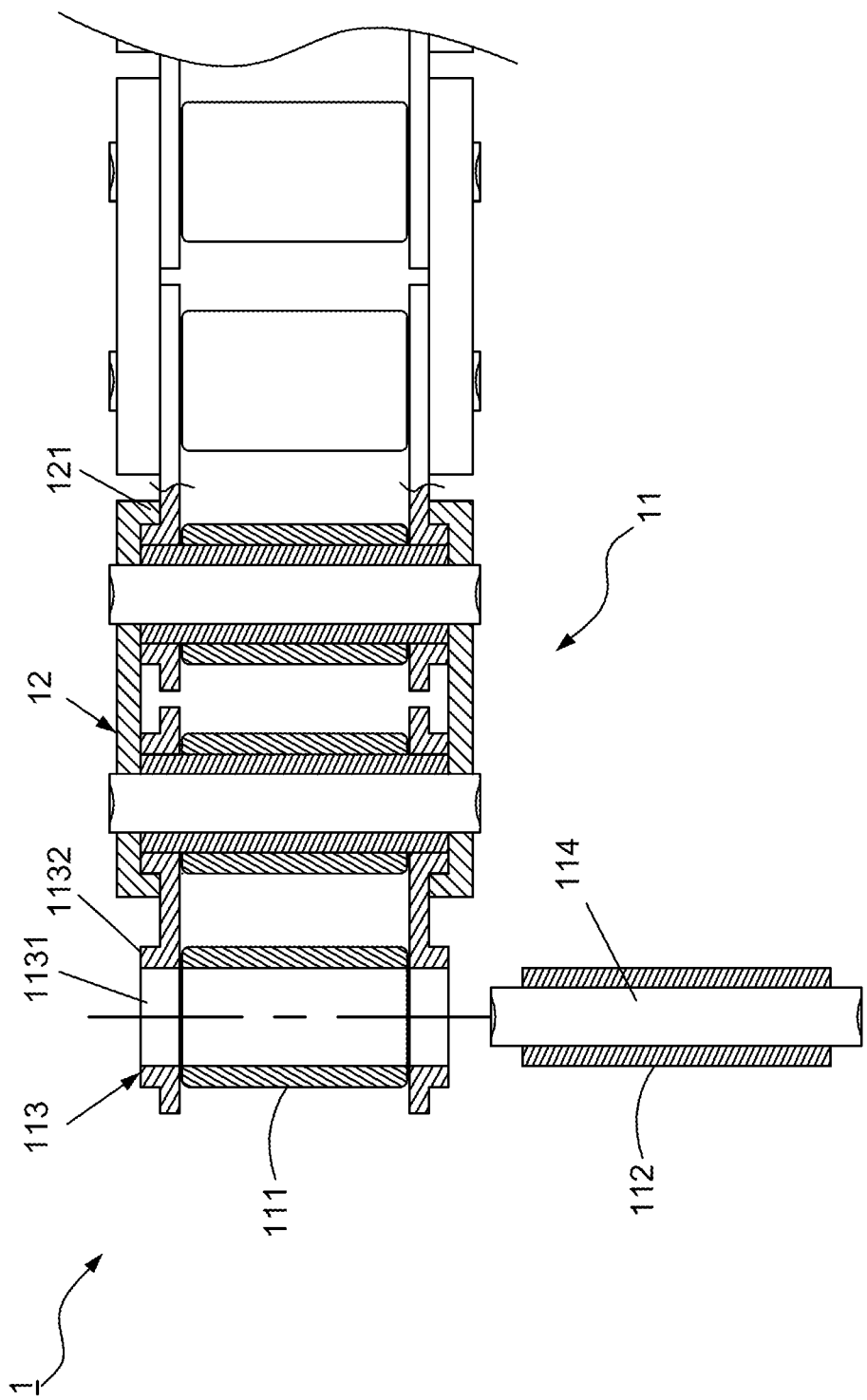
FIG. 1 is a cross-sectional view showing a conventional chain.
Figure 2:
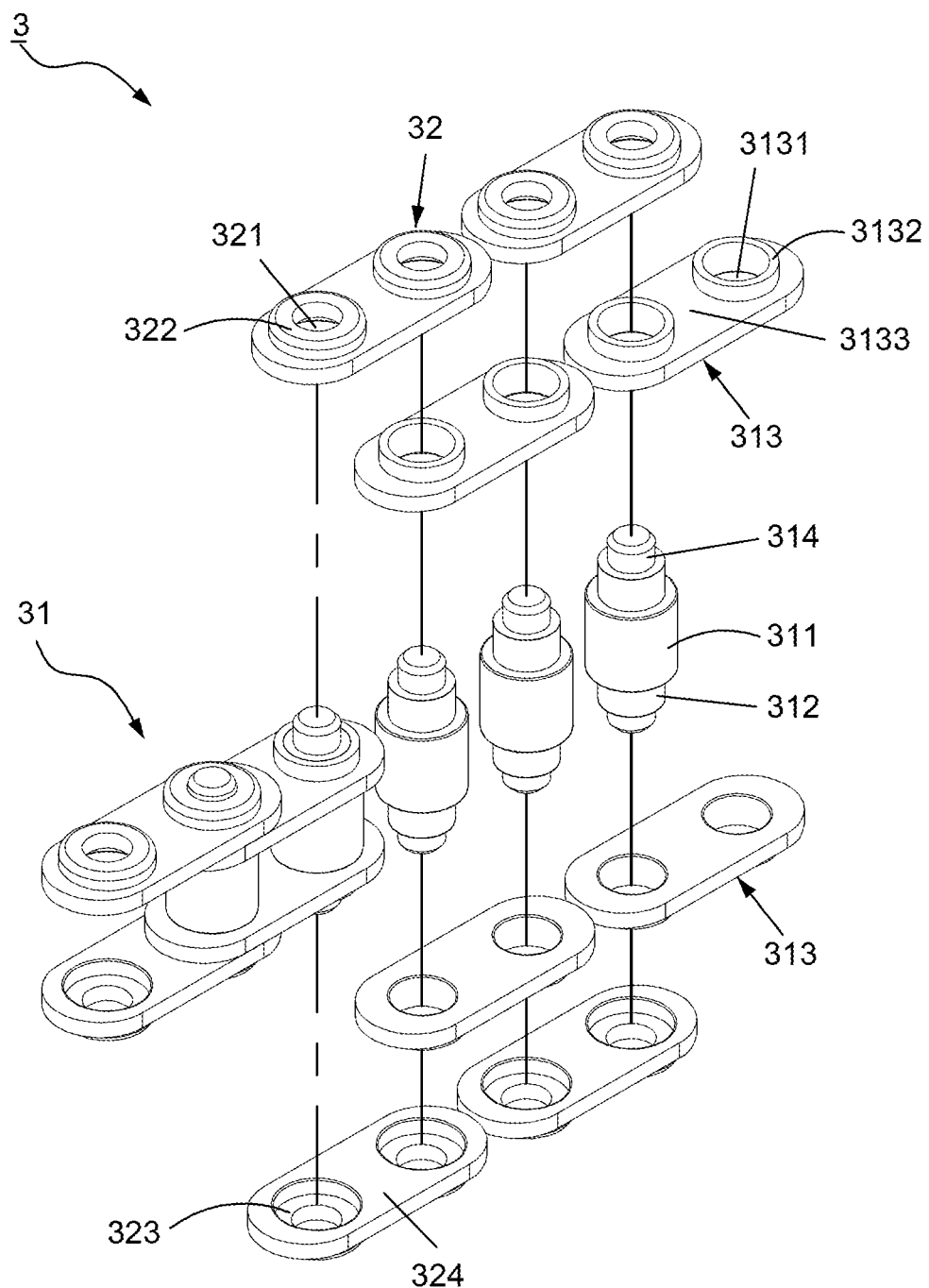
FIG. 2 is a perspective view showing a first preferred embodiment of this invention.
Figure 3:
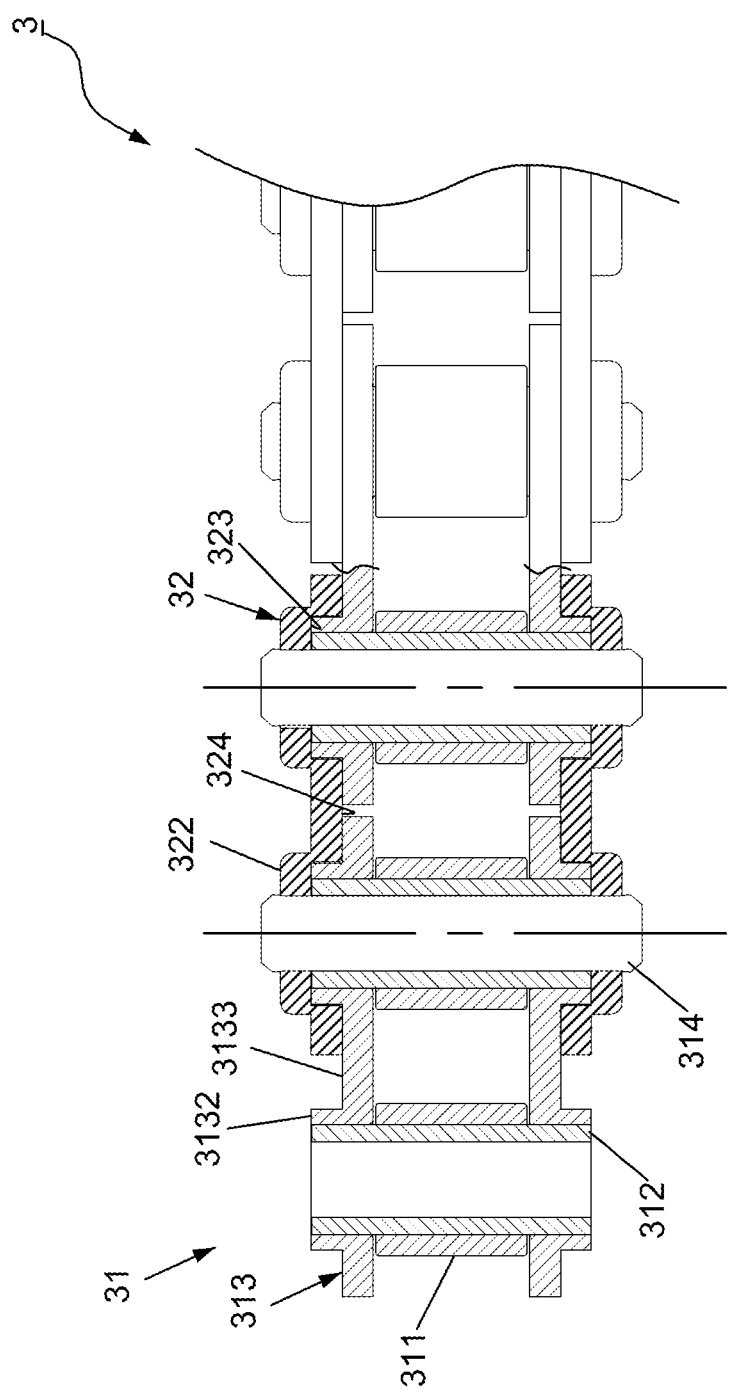
FIG. 3 is a cross-sectional view of the first preferred embodiment of this invention.

Referring to FIG. 2, a first preferred embodiment of a chain assembly 3 of this invention includes a plurality of chain units 31 serially connected to each other. Each chain unit 31 has a pair of rollers 311, a pair of bushings 312 disposed trough the rollers 311 respectively, a pair of inner plates 313 rotationally disposed on opposing sides of the bushings 312, and a pair of pins 314 threading axially through the bushings 312 and the inner plates 313 respectively. Two outer plates 32 are located on opposing sides of the inner plates 313 and rotationally fixed to the respective pins 314 between two abutting inner plates 313 of the abutting chain units 31. Each inner plate 313 has a pair of inner pin holes 3131, two rims 3132 projecting from the inner pin holes 3131 on one surface of each inner plate 313, and a contact area 3133 formed around the rims 3132. The rims 3132 can be formed on one surface of each inner plate 313 as shown in FIG. 2 or on both surfaces of each inner plate 313 (not shown). Here takes an example that the rims 3132 are formed on the same surface of each inner plate 313. Each outer plate 32 has a pair of outer pin holes 321, a pair of accommodation portions 322 projecting from the outer pin holes 321 on one surface of each outer plate 32 to define two rooms 323 formed into an opposing surface of each outer plate 32, and a positioning area 324 formed around the rooms 323. The rooms 323 are capable of accommodating the respective rims 3132 of the adjacent inner plates 313 and the positioning area 324 is in close contact with the contact areas 3133 of the abutting inner plates 313 when the respective rims 3132 are inserted into the rooms 323 and situated in position Referring to FIG. 2 and FIG. 3, when the chain units 31 couple together to provide the chain assembly 3. In other words, each outer plate 32 adjoins to the abutting inner plate 313, the rooms 323 of each outer plate 32 fully accommodate the respective rims 3132 of the abutting inner plate 313 to allow the rooms 323 to fit the rims 3132 tightly. Simultaneously, the positioning area 324 formed around the rooms 323 fits snugly with the contact area 3133 formed around the respective rims 3132 of the abutting inner plates 313. Hence, the abutting inner plates 313 are covered by the outer plate 32 fully. The engagement of the rooms 323 and the rims 3132 and the close fitting of the positioning area 324 and the contact areas 3133 prevent dust from entering and heaping in the chain assembly 3 and prevent the pins 314 from wearing or seizing up. Further, the inner plates 313 and the outer plates 32 press against each other firmly to enhance the whole structure strength and attain the smooth and stable transmission of the chain assembly 3. Whereby the service life is prolonged effectively.

To sum up, the chain assembly of this invention takes advantages that two rooms formed into the opposing surface of each outer plate are capable of accommodating the rims of the abutting inner plates and the positioning area defined around the rooms is capable of fitting tightly with the contact areas of the abutting inner plates when the respective rims are accommodated in the rooms. Therefore, each outer plate positions the abutting inner plates effectively to increase the structure strength and achieve the smooth and steady transmission. Furthermore, dust is kept outside to prevent the chain assembly from wearing or jamming. Whereby the service life of the chain assembly is extended.

While the embodiments of this invention are shown and described, it is understood that further variations and modifications may be made without departing from the scope of this invention.

What is claimed is:

1. A chain assembly comprising:

a plurality of chain units connected to each other;

each of said plurality of chain units having two aligned rollers, two bushings disposed through said rollers respectively, two inner plates rotationally disposed on opposing sides of said bushings, and two pins penetrating said bushings and said inner plates respectively;

two outer plates being respectively positioned on opposing sides of said inner plates and rotationally fixed to said respective pins between two adjacent inner plates of said adjacent chain units;

two spaced apart inner pin holes formed through each of said inner plates, two rims protruding from said inner pin holes on one surface of each inner plate to form a substantially planar contact surface; and two spaced apart outer pin holes formed through each of said outer plates, two accommodation portions protruding from said outer pin holes on an outer surface of each outer plate to provide two individual rooms displaced from each other formed within an inner surface of each of said outer plates capable of accommodating said respective rims of said adjacent inner plates, and a planar positioning surface formed on each of said outer plates being defined between and around said rooms, said planar positioning surface configured to be contiguous and fit snugly with said rims of said substantially planar contact surfaces of said adjacent inner plates when said respective rims are inserted into said rooms and placed in position.

* * * * *